April 9, 1968 R. GEBEL 3,377,491
MAGNETOHYDRODYNAMIC GENERATOR
Filed March 10, 1965

United States Patent Office 3,377,491
Patented Apr. 9, 1968

3,377,491
MAGNETOHYDRODYNAMIC GENERATOR
Rudolf Gebel, Erlangen, Germany, assignor to Siemens Aktiengesellschaft, Munich, Germany, a corporation of Germany
Filed Mar. 10, 1965, Ser. No. 438,532
Claims priority, application Germany, Mar. 11, 1964, S 88,092
3 Claims. (Cl. 310—11)

My invention relates to a magnetohydrodynamic generator, also known as a magnetoplasmadynamic generator, hereinafter referred to as an MHD generator.

In my copending application Ser. No. 407,505, filed Oct. 29, 1964, now Patent No. 3,280,350, I have described an MHD generator wherein an electrically conductive medium flows in a helical path through a magnetic field. An important advantage of such generators is their compact construction.

In order to guide the magnetic field through the working medium without scattering the magnetic force lines, I have provided, in accordance with the disclosure in my aforementioned copending application, electromagnet coils which are concentrically wound with respect to the axis of the helical flow path, sandwiching the flow chamber between them by respectively abutting both of the axial end faces thereof for producing a radially directed magnetic field in the flow chamber.

An undesirable side effect in MHD generators which have a helical flow path over which the working medium is guided, is the displacement of the working medium towards the periphery of the channel due to centrifugal forces. This causes increased friction and greater cooling of the medium at the channel wall.

My invention has as its main object the avoidance of the deficiencies and is based upon the recognition that they can be eliminated in an alternating current generator of the MHD type.

As described in my aforementioned copending application, an annular channel is provided as the flow chamber for the structure. Annular electrodes are located at both axial end faces of the flow chamber. The radial magnetic field can be produced therein by magnet coils that are wound in opposite directions or by two magnet coils wound in the same direction but connected to different electrical energizing poles.

In order to prevent displacement of the working medium toward the channel periphery with such MHD generators I provide in accordance with the present invention an MHD generator having magnet windings that are electrically connected to an alternating current power line and electrodes that are connected by electrical conductors to one another at the periphery of the annular channel, the electrical conductors being substantially parallel to the axis of the helical path.

The current flowing between the electrodes in the working medium and the return flow thereof over the outer channel wall of the annular channel produces an overlapping field on the applied magnetic field. This superimposed magnetic field together with the current flowing between the electrodes produce a centripetal force which opposes the centrifugal force on the working medium and is consequently able to balance the same. The working medium is diverted thereby from the outer channel wall and the annular channel in cross section is filled relatively uniformly with medium which produces good generator utilization.

In accordance with a further aspect of my invention, I provide an MHD generator wherein inductive reactive power is drawn from an alternating current network by the magnet windings for the formation of the magnetic fields and true power or output with alternating voltage is simultaneously fed into the network from the same windings. The generator is, therefore, particularly suitable for use with compound networks.

Other features which are considered as characteristic for the invention are set forth in the appended claims.

Although the invention has been illustrated and described as embodied in a magnetohydrodynamic generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of a specific embodiment when read in connection with the accompanying drawings, in which.

Figure 2:
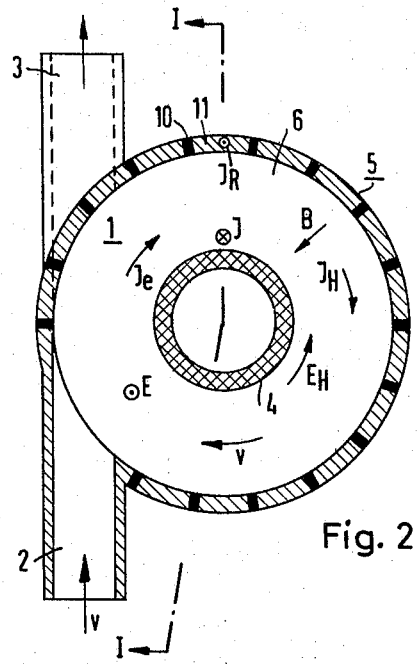
FIG. 2 is a transverse sectional view of FIG. 1 taken along the line II—II in the direction of the arrows.
Figure 3:
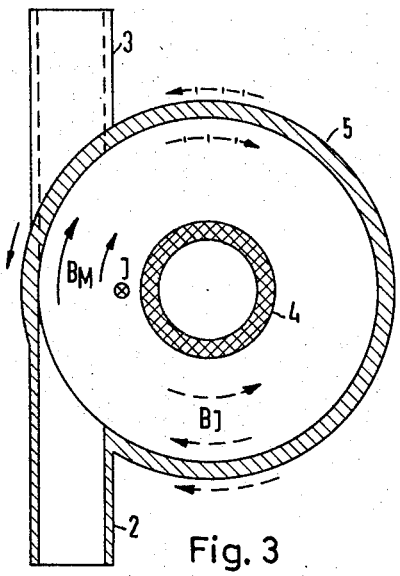
Figure 4:
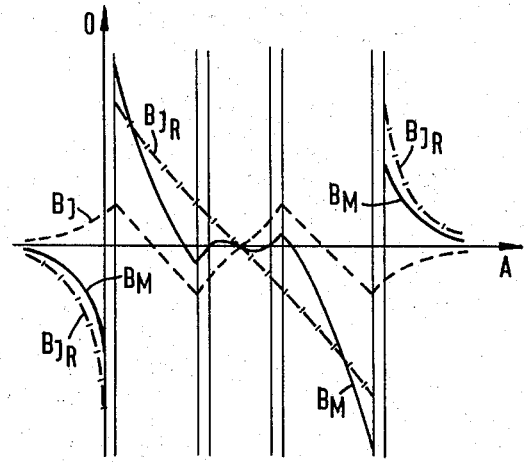

FIG. 3 is a simplified diagram of the transverse section shown in FIG. 2, in which the directions of the magnetic fields are indicated; and FIG. 4 is a plot of the magnetic field distribution considered with respect to FIG. 3 wherein the abscissa represents the distance A through the cross section shown in FIG. 3 and the ordinate indicates the magnetic induction B in the annular channel in arbitrary units.

Following is a compilation of the symbols used in the figures for the respective physical quantities or values:

B=magnetic induction of the applied field.
$B_I$=magnetic induction of the current I produced by the plasma flow $v$ and the applied magnetic field B.
$B_{I_R}$=magnetic induction of the return current $I_R$ flowing through the outer annular channel wall.
$B_M$=magnetic induction produced through the flowing plasma and resulting from $B_I$ and $B_{I_R}$.
E=field strength between the electrodes, which opposes the field strength induced in the plasma.
$E_H$=Hall field strength, which is measured between two imaginary test probes spaced one from the other in the plasma at the channel periphery.
I=current flowing between the electrodes which is produced by the plasma flow $v$ and the applied magnetic field B in the plasma.
$I_e$=energizing current which must flow through the magnetic coils to produce the applied magnetic field B. It is essentially a reactive current.
$I_H$=Hall current, which arises due to the current I between the electrodes and because of the applied magnetic field B.
$v$=plasma flow.

Figure 1:
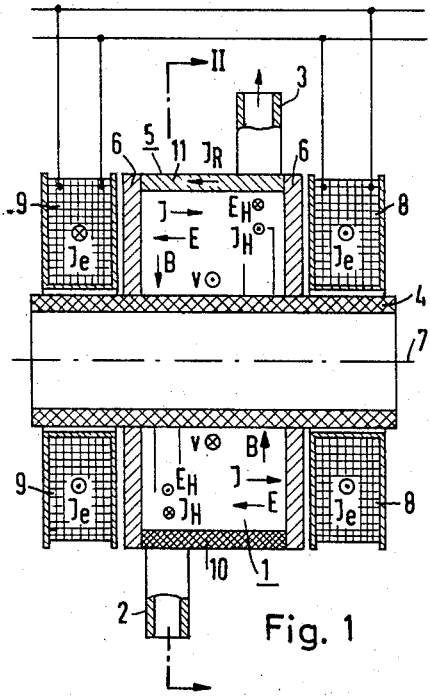
FIG. 1 is a partly schematic longitudinal cross-sectional view of an MHD generator constructed in accordance with my invention taken along the line I—I in FIG. 2 in the direction of the arrows.

Referring now to the drawings and first particularly to FIGS. 1 and 2, there is shown an MHD generator in respective longitudinal and transverse cross sections. Into a flow space or chamber 1 of a cylindrical annular generator channel, the plasma, having a velocity $v$ of the order of magnitude of about 1000 meters per second and a temperature of about 3000° C. is conducted through a supply tube 2 located tangentially to the flow space 1 and having for example a rectangular cross section, and it is discharged from the flow space 1 through a discharge tube 3 which is also of rectangular cross section in the embodiment shown in FIGS. 1 and 2. The annular channel of the MHD generator is defined by coaxial cylindrical walls 4 and 5 and by two annular electrodes 6 forming end walls of the flow space or chamber 1. The electrodes 6 are connected to one another at the periphery of the annular channel by segments 11 parallel to the longitudinal axis 7, which is coincident with the axis of the helical path, and consisting of electrically conducting material and respectively lying in planes passing through the axis 7. In FIG. 1 the cutting plane through the outer channel wall 5 actually passes through one of the conductive segments 11 which is consequently shown in cross section. Segments of insulating material or layers 10 of Blakite-cement are located adjacent to the conductor segments 11, one of the segments 10 being shown in cross section in the cutting plane of the outer channel wall at the bottom of FIG. 1. Concentrically to the longitudinal or helical flow path axis 7, annular magnetic coils 8 and 9 are attached at the electrodes 6 on both end faces of the annular channel or flow space. The coils 8 and 9 shown in the embodiment of FIGS. 1 and 2 consist of superconductive material and produce the applied magnetic field B. In the illustrated embodiment, the two coils 8 and 9 are wound in the same direction and are connected by opposite poles to a power system N to which they feed true power or output. The inner cylinder 4 which forms the inner channel wall can consist of electrically insulating material such as ceramic or can also be of other material insulated, however, by electrically insulating cement layers from the electrodes 6. The cylindrical wall 5 of the annular channel, consisting of segments 10 and 11, must be constructed solely of materials that are not magnetically conducting. Because of the centripetal direction of the plasma, the requirements for the material of the outer cylindrical wall 5 are lessened or reduced. Copper can be employed as the material for the conductive segments 11 which, if necessary, can be cooled.

In the transverse sectional view of FIG. 2 a clear view of the division of the outer cylinder wall 5 of the annular channel into electrically conducting segments 11 and into the layers of insulating material 10 is shown.

The generator constructed in accordance with my invention and shown in FIGS. 1 and 2 operates as follows:

The annular channel 1 in FIG. 1 is subjected to an applied radial magnetic field with the inductance B produced by the coils 8 and 9. An electrically conducting working medium, for example a gas with plasma characteristics, is fed through the inlet 2 tangentially to the plasma flow chamber or annular channel 1. The plasma passes through the annular channel 1 on a helical path with a velocity $v$ and discharges therefrom in the direction of the associated arrow through the outlet 3. A current I is induced in the plasma perpendicularly to the plasma flow of velocity $v$ and to the magnetic field with the inductance B and produces an electrical field strength E between the annular electrodes 6.

The electrodes 6 are conductively connected through the electrically conducting segments 11 of the cylindrical channel wall 5. The currents I through the plasma and the reverse currents $I_R$ constitute circular currents through the conductive segments of the channel wall 5. When one considers that conduction in the plasma takes place through the electrons, it is readily understandable that these circular currents release Hall currents in the direction $I_H$ due to the applied magnetic field of inductance B. These circular Hall currents surrounding the axis 7 (see FIG. 1) are directed opposite to the field strength $E_H$ which is measured between the imaginary test probes in the plasma.

In the simplified cross-sectional view of FIG. 3 there are shown the magnetic inductance $B_I$ of the current I in the plasma betwen the electrodes, the inductance $B_{I_R}$ of the reverse current $I_R$, as well as the inductance $B_M$ resulting therefrom in accordance with their direction and size.

The wall spacing of the indicated generator cross section shown in FIG. 3 is projected on the abscissa A of the diagram shown in FIG. 4 and the values of the magnetic inductance B are plotted along the ordinate O in arbitrary units. Thus a qualitative impression of the inductance distribution is obtained. The magnetic inductance is thereby plotted on the ordinate above the abscissa which passes through the axis of the annular channel in the plane of the illustration of FIG. 3.

The inductance $B_M$ resulting from the magnetic inductances $B_I$ and $B_{I_R}$ and taking place first in the working medium, surges strongly against the periphery of the annular channel. Thereafter, centripetal forces cooperating with the currents flowing in between the electrodes in the plane of the drawing of FIG. 3 are exerted on the plasma. This dynamic effect is greatest at the periphery of the annular channel and reduces to zero at the inner wall of the annular channel. Since, on the other hand, the centrifugal force is inversely proportional to the radius of the path for constant velocity of the plasma along the flow path, the effect of the centrifugal force on the plasma is reduced. Crowding of the plasma in front of the channel wall is thus widely avoided.

The generative power is produced through the inductive effect on the coils 8 and 9 of the circular Hall current $I_H$ (FIG. 1 or 2) which surrounds the axis 7.

It is, of course, understood that the outer cylinder wall 5 of the annular channel can be constructed also of an undivided or unitary material and that conductors can be located on the outside of the annular channel to provide conductive connection of the electrode 6. The channel walls can then be uniformly made of ceramic materials or also of refined steels which are insulated by electrically insulating cement joints from the electrodes. The outer cylindrical wall of the annular channel can, when required, also be conically formed so as to take into account changes in volume and velocity of the plasma when it is being cooled due to the output being withdrawn.

I claim:

1. MHD generator comprising an annular flow chamber for the passage of ionized gaseous medium in a helical path about an axis, said chamber having a pair of annular electrodes forming opposite end walls thereof respectively, a plurality of electrical conductors extending substantially parallel to said axis at a peripheral wall of said annular flow chamber intermediate to and electrically connecting said annular electrodes, and an annular electromagnet coil mounted coaxially to said helical path outside said chamber and adjacent each of said electrodes, each of said coils being energizable by an alternating current supply for producing a magnetic field extending substantially radially to said axis in said annular flow chamber.

2. MHD generator comprising an annular flow chamber for the passage of ionized gaseous medium in a helical path about an axis, said chamber having a pair of annular electrodes forming opposite end walls thereof respectively, and a peripheral wall intermediate to said annular electrodes, said peripheral wall comprising a plurality of electrically conducting segments extending substantially parallel to said axis and electrically connecting said annular electrodes, and an annular electromagnet coil mounted coaxially to said helical path outside said chamber and adjacent each of said electrodes, each of said coils being energizable by an alternating current supply for producing a magnetic field extending substantially radially to said axis in said annular flow chamber.

3. MHD generator comprising an annular flow chamber for the passage of ionized gaseous medium in a helical path about an axis, said chamber having a pair of annular electrodes forming opposite end walls thereof respectively, and a peripheral wall intermediate said annular electrodes, said peripheral wall comprising a plurality of electrically conducting segments and a plurality of electrically insulating cement joints disposed peripherally about said flow chamber, said segments extending substantially parallel to said axis and electrically connecting said annular electrodes, and an annular electromagnet coil mounted coaxially to said helical path outside said chamber and adjacent each of said electrodes, each of said coils being energizable by an alternating current supply for producing a magnetic field extending substantially radially to said axis in said annular flow chamber.

References Cited

UNITED STATES PATENTS 2,716,943   9/1955   Vandenberg _____ 103—1

DAVID X. SLINEY, *Primary Examiner.*

UNITED STATES PATENT OFFICE
CERTIFICATE OF CORRECTION

Patent No. 3,377,491

April 9, 1968

Rudolf Gebel

It is certified that error appears in the above identified patent and that said Letters Patent are hereby corrected as shown below:

In the heading to the printed specification, line 8, "S 88,092" should read -- S 89,941 --.

Signed and sealed this 28th day of October 1969.

(SEAL)
Attest:

Edward M. Fletcher, Jr.
Attesting Officer

WILLIAM E. SCHUYLER, JR.
Commissioner of Patents